(12) United States Patent
Tang et al.

(10) Patent No.: US 10,834,903 B2
(45) Date of Patent: Nov. 17, 2020

(54) DOUBLE ROPE PET LEASH

(71) Applicant: Best-Run Technology Ltd., Zhejiang (CN)

(72) Inventors: Wenwei Tang, Zhejiang (CN); Qingfeng Dai, Zhejiang (CN); Yingzhou Chen, Zhejiang (CN); Zhaoxin Wu, Zhejiang (CN); Ying Tang, Zhejiang (CN)

(73) Assignee: Best-Run Technology Ltd., Zhejiang (CN)

( * ) Notice: Subject to any disclaimer, the term of this patent is extended or adjusted under 35 U.S.C. 154(b) by 133 days.

(21) Appl. No.: 16/217,050

(22) Filed: Dec. 12, 2018

(65) Prior Publication Data
US 2020/0053985 A1 Feb. 20, 2020

(30) Foreign Application Priority Data

Aug. 15, 2018 (CN) ...................... 2018 2 1320324 U

(51) Int. Cl.
*A01K 27/00* (2006.01)
(52) U.S. Cl.
CPC .......... *A01K 27/003* (2013.01); *A01K 27/005* (2013.01)
(58) Field of Classification Search
CPC ..... A01K 27/00; A01K 27/003; A01K 27/004
USPC ......................................... 119/769, 795, 796
See application file for complete search history.

(56) References Cited

U.S. PATENT DOCUMENTS

| | | | | |
|---|---|---|---|---|
| 3,853,283 A * | 12/1974 | Croce | .................. | A01K 27/004 242/381.6 |
| 3,937,418 A * | 2/1976 | Critelli | ................. | A01K 27/004 242/384.7 |
| 5,681,225 A * | 10/1997 | Cary | .................. | A63B 21/0552 119/792 |
| 6,148,773 A * | 11/2000 | Bogdahn | .............. | A01K 27/004 119/794 |
| 6,273,029 B1 * | 8/2001 | Gish | .................... | A01K 27/001 119/792 |
| 8,528,850 B2 * | 9/2013 | Bogdahn | .............. | A01K 27/004 119/796 |

FOREIGN PATENT DOCUMENTS

CN 204707709 10/2015

* cited by examiner

*Primary Examiner* — Richard T Price, Jr.
(74) *Attorney, Agent, or Firm* — JCIPRNET

(57) ABSTRACT

A double rope pet leash includes a leash body. A leash cavity is located in the leash body. A first leash assembly and a second leash assembly are connected to the leash body. The first leash assembly is fixedly connected with the leash body. The second leash assembly is located in the leash cavity and rotatably connected to the leash body. A first leash rope is pressed on the surface of the first leash assembly, and a second leash rope is pressed on the surface of the second leash assembly. The double rope pet leash further includes an open-close assembly connected to the leash body and capable of opening or closing the leash cavity.

8 Claims, 2 Drawing Sheets

DOUBLE ROPE PET LEASH

CROSS-REFERENCE TO RELATED APPLICATION

This application claims the priority benefit of China application serial no. 201821320324.3, filed on Aug. 15, 2018. The entirety of the above-mentioned patent application is hereby incorporated by reference herein and made a part of this specification.

BACKGROUND OF THE DISCLOSURE

Field of the Disclosure

The disclosure belongs to the technical field of pet leash, in particular to a double rope pet leash.

Description of Related Art

At present, pet leash buckles on the market are typically designed with only one position for connection, and only one leash can be fixedly connected, which lacks flexibility in use. For users having more than one pet, there are many inconveniences in actual use.

For example, Chinese utility model publication discloses a multifunctional pet leash (Application No.: 201520405866.0), which includes a housing provided with a handle and a leash disposed in the housing, characterized in that the housing is formed by two symmetrical half bodies. A gap is formed between the two half bodies for the leash to extend out of the housing. The leash is provided with a bead outside the housing. Storage slots are respectively disposed on both sides of the housing. The leash further includes a plurality of functional covers that may be threadedly connected to the storage slot. The housing and the handle are an integral structure.

The above disclosure has high practicability with complete functions, but it still does not solve the problem that only one leash can be fixedly connected.

SUMMARY OF THE DISCLOSURE

The present disclosure provides a double rope pet leash to solve the above problem.

In order to achieve the above purpose, the present disclosure adopts the following technical solution.

A double rope pet leash includes a leash body and a leash cavity located in the leash body. The leash body is connected with a first leash assembly and a second leash assembly. The first leash assembly is fixed on the leash body. The second leash assembly is located within the leash cavity and is rotatably connected to the leash body. The double rope pet further includes an open-close assembly connected to the leash body and capable of opening or closing the leash cavity.

The above-described double rope pet leash further includes a first leash rope that is pressed on a surface of the first leash assembly, and a second leash rope that is pressed on a surface of the second leash assembly.

In the above-described double rope pet leash, a first leash assembly includes a first leash shaft integrally formed with the leash body. The first leash shaft and the leash body cooperatively form a boundary of the leash cavity. The first leash rope is pressed on a surface at one end of the first leash shaft close to the leash cavity.

In the above-mentioned double rope pet leash, the open-close assembly includes a knob and a torsion bar that are fixedly connected to each other. The torsion bar is rotatably connected to the leash body. The knob is rotatable to allow the torsion bar to pass through the first leash shaft and be pressed on an inner surface of the leash body.

In the above-described double rope pet leash, the inner surface of the leash body has a sealed groove recessed toward inside of the leash body, and the axis of the torsion bar passes through a center of the closed groove.

In the above-described double rope pet leash, the cross-sectional area of the knob is larger than the cross-sectional area of the torsion bar.

In the above-described double rope pet leash, the second leash assembly includes a second leash shaft that is located in the leash cavity and is fixedly connected to the leash body at both ends. The second leash assembly further includes a roller sleeved on the second leash shaft and rotatable relative to the second leash shaft, wherein the second leash rope is pressed on the surface of the roller.

In the above-mentioned double rope pet leash, the second leash assembly includes a leash shaft. Both ends of the leash shaft are respectively rotatably connected to the leash body through a short connecting rod. A cross-sectional area of the leash shaft is gradually reduced toward a center thereof from the both ends. The second leash rope is pressed at a center of the leash shaft.

As compared with related art, the advantageous effects of the disclosure are:

1. The disclosure is capable of achieving the purpose of connecting two leash ropes simultaneously, and expands the application range of the product.

2. The disclosure is adaptable to different shapes of leash rope by changing the shape of the second leash assembly, and has simple structure while being easy to operate, convenient for use and maintenance, and is suitable for large-scale production and use.

In order to make the aforementioned features and advantages of the disclosure more comprehensible, embodiments accompanying figures are described in detail below.

DESCRIPTION OF EMBODIMENTS

The present disclosure is further described in detail below with reference to the drawings and specific embodiments.

Embodiment 1

Figure 1:
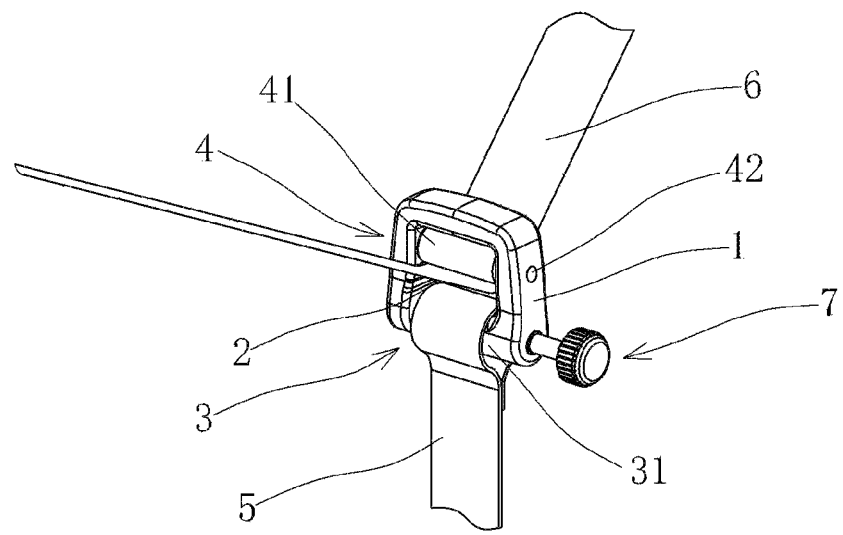
FIG. 1 is a schematic structural view illustrating that an open-close assembly of embodiment 1 is opened.
Figure 2:
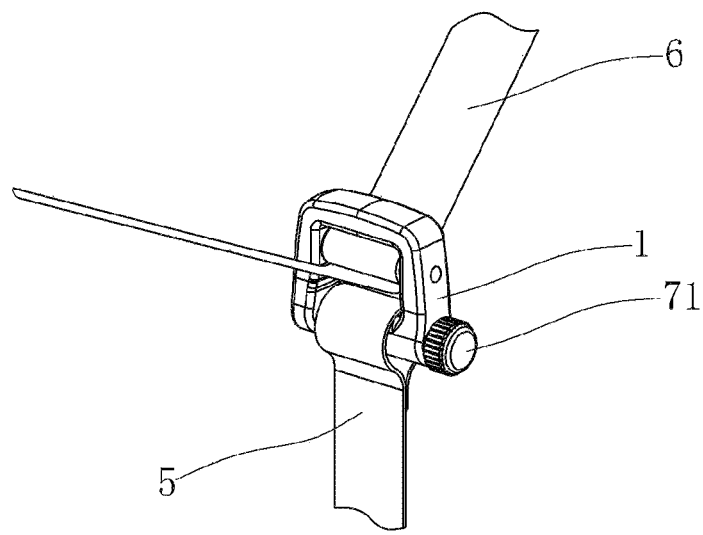
FIG. 2 is a schematic structural view illustrating that the open-close assembly of embodiment 1 is closed.

Referring to FIG. 1 and FIG. 2, a double rope pet leash includes a leash body 1. A leash cavity 2 is located in the leash body 1. The leash body 1 is connected with a first leash assembly 3 and a second leash assembly 4. The first leash assembly 3 is fixedly connected with the leash body 1. The second leash assembly 4 is located in the leash cavity 2 and is rotatably connected with the leash body 1. The first leash rope 5 is pressed on a surface of the first leash assembly 3.

The second leash rope 6 is pressed on a surface of the second leash assembly 4. An open-close assembly 7 connected to the leash body 1 and capable of opening or closing the leash cavity 2 is further included.

In the disclosure, when in use, the leash cavity 2 is opened by the open-close assembly 7, the first leash rope 5 and the second leash rope 6 are respectively pressed on the surfaces of the first leash assembly 3 and the second leash assembly 4, and then the leash cavity 2 is closed by the open-close assembly 7, thereby preventing the first leash rope 5 and the second leash rope 6 from coming out of the leash cavity 2 during use. With such configuration, the disclosure may achieve the purpose of connecting two leash ropes simultaneously and expand the application range of the product.

As shown in FIG. 1, the first leash assembly 3 includes a first leash shaft 31 integrally formed with the leash body 1, which facilitates to secure connection of the first leash shaft 31 and the leash body 1. The first leash shaft 31 and the leash body 1 cooperatively form a boundary of the leash cavity 2, which simplifies the product structure and makes the operation easier while reducing the manufacturing cost. The first leash rope 5 is pressed on a surface at one end of the first leash shaft 31 close to the leash cavity 2.

Figure 3:
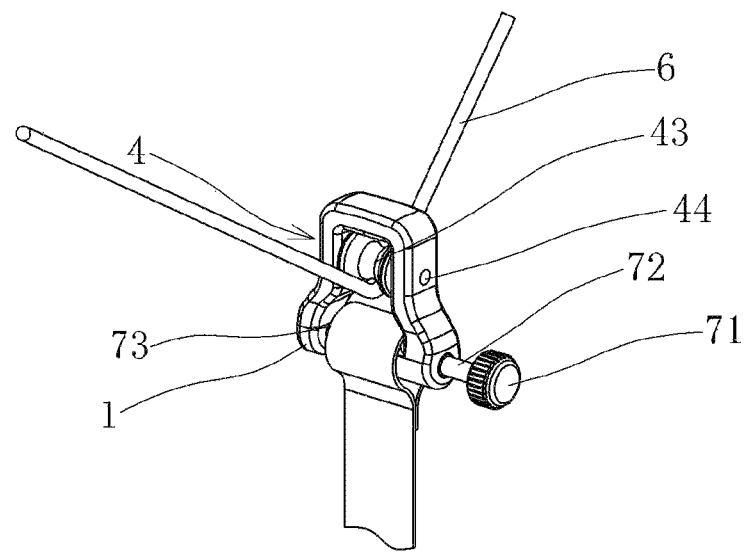
FIG. 3 is a schematic structural view illustrating that the open-close assembly of embodiment 2 is opened.

As shown in FIG. 3, the open-close assembly 7 includes a knob 71 and a torsion bar 72 that are fixedly connected to each other. The torsion bar 72 is rotatably connected to the leash body 1. The knob 71 may be rotated such that the torsion bar 72 passes through the first leash shaft 31 and is pressed on an inner surface of the leash body 1, thereby controlling the torsion bar 72 to move in an axial direction by rotating the knob 71 and achieving the opening and closing of the leash cavity 2.

Preferably, the inner surface of the leash body 1 further has a sealed groove 73 recessed toward inside of the leash body 1, and an axis of the torsion bar 72 passes through a center of the sealed groove 73. In this manner, when the knob 71 is rotated to make the torsion bar 72 to be pressed on the inner surface of the leash body 1, an end portion of the torsion bar 72 is located in the sealed groove 73, which further ensures that the first leash rope 5 and the second leash rope 6 do not come out of the leash cavity 2 during use.

Preferably, the knob 71 has a cross-sectional area greater than a cross-sectional area of the torsion bar 72, which facilitates rotation of the torsion bar 72.

As shown in FIG. 1, the second leash assembly 4 includes a second leash shaft 41 located in the leash cavity 2 and fixedly connected to the leash body 1 at both ends, and further includes a roller 42 sleeved on the second leash shaft 41 and rotatable relative to the second leash shaft 41. The second leash rope 6 is pressed on a surface of the roller 42 so as to reduce frictional force on the second leash rope 6 during use, thereby improving flexibility during use. The second leash assembly 4 of such structure is more suitable for the second leash rope 6 having a flat-shape.

Embodiment 2

This embodiment is substantially the same as the structure of embodiment 1, and difference lies merely in the specific structure of the second leash assembly 4.

Figure 4:
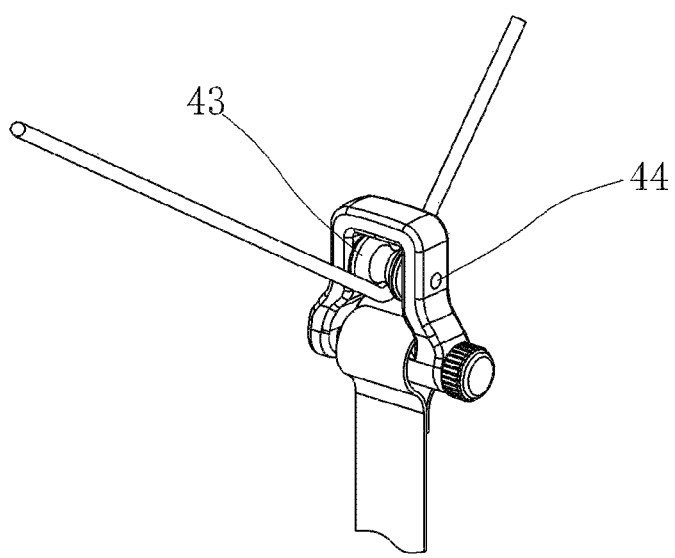
FIG. 4 is a schematic structural view illustrating that the open-close assembly of embodiment 2 is closed.

As shown in FIG. 3 and FIG. 4, the second leash assembly 4 includes a leash shaft 43. Both ends of the leash shaft 43 are respectively rotatably connected to the leash body 1 through a short connecting rod 44. A cross-sectional area of the leash shaft 43 is gradually reduced from the both ends toward a center thereof, that is, the leash shaft 43 is in the shape of a dumbbell which is thin in the middle and thick at both ends. The second leash rope 6 is pressed at a center of the leash shaft 43, so that the second leash rope 6 is not severely swung to the right and left during use, and the second leash assembly 4 with such structure is more suitable for the second leash rope 6 in a cylindrical shape.

The specific embodiments described herein are merely illustrative of the spirit of the disclosure. A person skilled in the art may make various modifications or additions to the specific embodiments described herein or replace them in a similar manner without departing from the spirit of the disclosure or exceeding beyond the scope defined by claims.

Although the disclosure uses the following terminologies more frequently such as the leash body 1, the leash cavity 2, the first leash assembly 3, the second leash assembly 4, the first leash rope 5, the second leash rope 6, the open-close assembly 7, the first leash shaft 31, the second leash shaft 41, the roller 42, the leash shaft 43, the short connecting rod 44, the knob 71, the torsion bar 72, the sealed groove 73, and the like, which does not exclude the possibility that other terms might be used. These terms are used only for describing and explaining the nature of the present disclosure more easily; any interpretations of them as additional limitations are to be construed as being inconsistent with the spirit of the present disclosure.

What is claimed is:

1. A double rope pet leash, comprising a leash body and a leash cavity located in the leash body, wherein the leash body is connected to a first leash assembly and a second leash assembly, the first leash assembly is fixedly connected to the leash body, the first leash assembly comprises a first leash shaft integrally formed with the leash body, the first leash shaft and the leash body cooperatively form a boundary of the leash cavity, and the second leash assembly is located within the leash cavity and is rotatably connected to the leash body, and the second leash assembly comprises a second leash shaft located in the leash cavity and fixedly connected to the leash body at both ends, the double rope pet leash further comprising an open-close assembly connected to the leash body and capable of opening or closing the leash cavity, wherein a first leash rope is pressed on a surface at one end of the first leash shaft close to the leash cavity, a second leash rope is pressed on a surface of the second leash assembly, the open-close assembly includes a knob and a torsion bar fixedly connected to each other, the torsion bar is rotatably connected to the leash body, and the knob is rotatable to allow the torsion bar to pass through the first leash shaft and be pressed on an inner surface of the body.

2. The double rope pet leash according to claim 1, further comprising a first leash rope pressed on a surface of the first leash assembly and a second leash rope pressed on a surface of the second leash assembly.

3. The double rope pet leash according to claim 2, wherein the first leash assembly comprises a first leash shaft integrally formed with the leash body, the first leash shaft and the leash body cooperatively form a boundary of the leash cavity, and the first leash rope is pressed on a surface at one end of the first leash shaft close to the leash cavity.

4. The double rope pet leash according to claim 3, wherein the open-close assembly comprises a knob and a torsion bar fixedly connected to each other, the torsion bar is rotatably connected to the leash body, the knob is rotatable to allow the torsion bar to pass through the first leash shaft and be pressed on an inner surface of the leash body.

5. The double rope pet leash according to claim 4, wherein the inner surface of the leash body has a sealed groove recessed toward inside of the leash body, an axis of the torsion bar passes through a center of the sealed groove.

6. The double rope pet leash according to claim 4, wherein the knob has a cross-sectional area greater than a cross-sectional area of the torsion bar.

7. The double rope pet leash according to claim 2, wherein the second leash assembly comprises a second leash shaft located in the leash cavity and fixedly connected to the leash body at both ends, the second leash assembly further comprises a roller sleeved on the second leash shaft and rotatable relative to the second leash shaft, and the second leash rope is pressed on a surface of the roller.

8. The double rope pet leash according to claim 2, wherein the second leash assembly comprises a leash shaft, both ends of the leash shaft are respectively rotatably connected to the leash body through a short connection rod, a cross-sectional area of the leash shaft is gradually reduced from the both ends toward a center thereof, and the second leash rope is pressed in a center of the leash shaft.

* * * * *